United States Patent
Adkar et al.

(10) Patent No.: US 11,370,326 B2
(45) Date of Patent: Jun. 28, 2022

(54) SYSTEMS AND METHODS FOR DETECTING AN UNATTENDED CHILD IN A CHILD SAFETY SEAT OF A VEHICLE

(71) Applicant: Verizon Patent and Licensing Inc., Arlington, VA (US)

(72) Inventors: Ketan Shridhar Adkar, Alpharetta, GA (US); Charles Forbes Stickels, Milton, GA (US); John Gregory Bosque, Roswell, GA (US); Diego Mondragon, Roswell, GA (US); Joseph Richard Cantrell, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 448 days.

(21) Appl. No.: 16/659,962

(22) Filed: Oct. 22, 2019

(65) Prior Publication Data

US 2021/0114484 A1 Apr. 22, 2021

(51) Int. Cl.
*B60N 2/00* (2006.01)
*B60N 2/28* (2006.01)
*B60R 22/48* (2006.01)
*B60R 22/10* (2006.01)
*B60W 50/14* (2020.01)

(52) U.S. Cl.
CPC .......... *B60N 2/002* (2013.01); *B60N 2/2812* (2013.01); *B60R 22/105* (2013.01); *B60R 22/48* (2013.01); *B60W 50/14* (2013.01); *B60N 2002/2815* (2013.01); *B60R 2022/4808* (2013.01)

(58) Field of Classification Search
CPC .... B60N 2/002; B60N 2/2812; B60R 22/105; B60R 22/48; B60W 50/14
USPC ......................................................... 340/457
See application file for complete search history.

(56) References Cited

U.S. PATENT DOCUMENTS

| | | | |
|---|---|---|---|
| 7,523,802 B2* | 4/2009 | Kamiki | B60R 22/48 340/576 |
| 2004/0066291 A1* | 4/2004 | Tracy | B60N 2/2812 340/686.1 |
| 2004/0095252 A1* | 5/2004 | Kraljic | G08B 21/22 340/687 |
| 2007/0182535 A1* | 8/2007 | Seguchi | B60R 22/48 340/687 |
| 2009/0243892 A1* | 10/2009 | Cheung | A44B 11/2569 340/945 |

(Continued)

*Primary Examiner* — Kerri L Mcnally

(57) ABSTRACT

A detection system may include a first sleeve shaped to receive and retain a buckle of a child safety seat. The first sleeve may include a first body portion shaped to receive and retain the buckle, a male connector portion integrally formed with the first body portion, and a transmitter electrically coupled to the male connector portion. The detection system may include a second sleeve shaped to receive and retain a buckle connector. The second sleeve may include a second body portion shaped to receive and retain the buckle connector, a female connector portion connected to the second body portion, and a battery electrically coupled to the female connector portion and configured to provide energy to the transmitter when the male connector portion communicates with the female connector portion. The transmitter may generate a signal, indicating a presence of a child, when the transmitter receives energy from the battery.

20 Claims, 12 Drawing Sheets

(56) References Cited

U.S. PATENT DOCUMENTS

2010/0283593 A1* 11/2010 Miller ................ B60C 23/0408
340/447
2019/0335861 A1* 11/2019 Ritchie .................. B60R 22/48

* cited by examiner

SYSTEMS AND METHODS FOR DETECTING AN UNATTENDED CHILD IN A CHILD SAFETY SEAT OF A VEHICLE

BACKGROUND

A child may be saved when they are properly secured in a child safety seat during a vehicle accident. Leaving a child inside a parked vehicle, even for a second, can be deadly. However, some caregivers do accidentally forget children secured in a child safety seat.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1A:
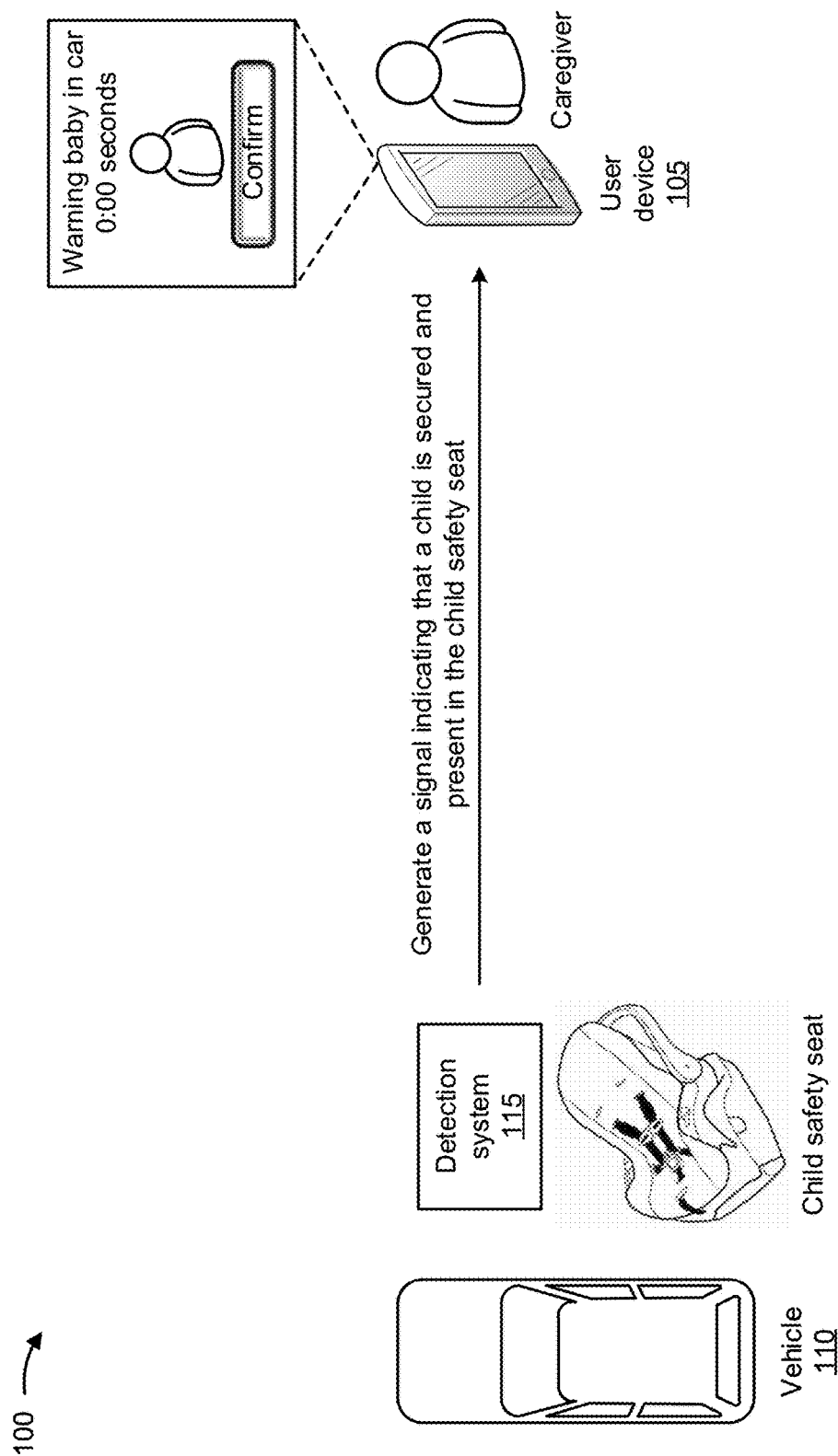

The following detailed description of example implementations refers to the accompanying drawings. The same reference numbers in different drawings may identify the same or similar elements.

A child may be injured or die if left in a child safety seat of a vehicle after a caretaker has left the vehicle, or if the child is not secured properly in the safety seat. Emergency responders (e.g., police, emergency medical technicians, fire departments, and/or the like) may be called to care for injured children left in child safety seats of vehicles. Thus, computing resources (e.g., processing resources, memory resources, communication resources, and/or the like), networking resources, emergency response resources, hospital resources, and/or the like are wasted in responding to injured children left in child safety seats of vehicles, investigating caregivers responsible for the injured children, caring for the injured children, and/or the like.

Some implementations described herein provide a detection system that detects and prevents leaving a child unattended in a child safety seat of a vehicle. For example, the detection system may include a first sleeve, shaped to receive and retain a buckle of a child safety seat. The first sleeve may include a first body portion shaped to receive and retain the buckle of the child safety seat, a male connector portion integrally formed with the first body portion, and a transmitter electrically coupled to the male connector portion. The detection system may include a second sleeve, shaped to receive and retain a buckle connector of the child safety seat. The buckle connector of the child safety seat may be configured to receive and connect with the buckle of the child safety seat. The second sleeve may include a second body portion shaped to receive and retain the buckle connector of the child safety seat, a female connector portion connected to the second body portion, and a battery that is electrically coupled to the female connector portion and configured to provide energy to the transmitter when the male connector portion communicates with the female connector portion. The male connector portion may communicate with the female connector portion when the belt buckle connector connects with the belt buckle. The transmitter may be configured to generate a signal, indicating that a child is present in the child safety seat, when the transmitter receives energy from the battery.

In this way, the detection system may detect and prevent leaving children unattended in child safety seats of vehicles, which may preclude a need for emergency responders, hospital personnel, and/or the like. Thus, the detection system conserves computing resources (e.g., processing resources, memory resources, communication resources, and/or the like), networking resources, emergency response resources, hospital resources, and/or the like that would otherwise be wasted in responding to injured children left in child safety seats of vehicles, investigating caregivers responsible for the injured children, caring for the injured children, and/or the like.

FIGS. 1A-1I are diagrams of one or more example implementations 100 described herein. Many jurisdictions require children defined by age, weight, and/or height to use an approved child safety seat when traveling in a vehicle. As shown in FIG. 1A, a user device 105 may be associated with a vehicle 110 and a detection system 115 provided with a child safety seat. The child safety seat may include a seat specifically designed to protect children from injury or death during vehicle collisions. The child safety seat may be removable from the vehicle or may be integrated into the vehicle. Detection system 115 may include a system that detects and prevents leaving a child unattended in the child safety seat of the vehicle.

As further shown in FIG. 1A, detection system 115 may generate a signal indicating that a child is secured and present in the child safety seat (e.g., when the child is buckled in the child safety seat). In some implementations, the signal may be received by user device 105 within a particular distance that is based on a strength of the signal. For example, the particular distance may be five meters, ten meters, twenty meters, and/or the like. When user device 105 fails to receive the signal, user device 105 may display a user interface to a caregiver (e.g., a parent, a babysitter, a sibling, a grandparent, and/or the like) associated with user device 105. For example, the user interface may include information indicating that the child was left inside vehicle 110 in the child safety seat, and prompting the caregiver to confirm (e.g., via selection of an input mechanism of the user interface) that the caregiver received the information indicating that the child is inside vehicle 110 in the child safety seat. In this way, the caregiver can immediately return to vehicle 110 and retrieve the child so that the child is not left unattended in vehicle 110. In some implementations, a software application may be installed on user device 105 which causes user device 105 to receive the signal from detection system 115, display the user interface, enable the caregiver to set preferences associated with operation of detection system 115, and/or the like.

Figure 1B:
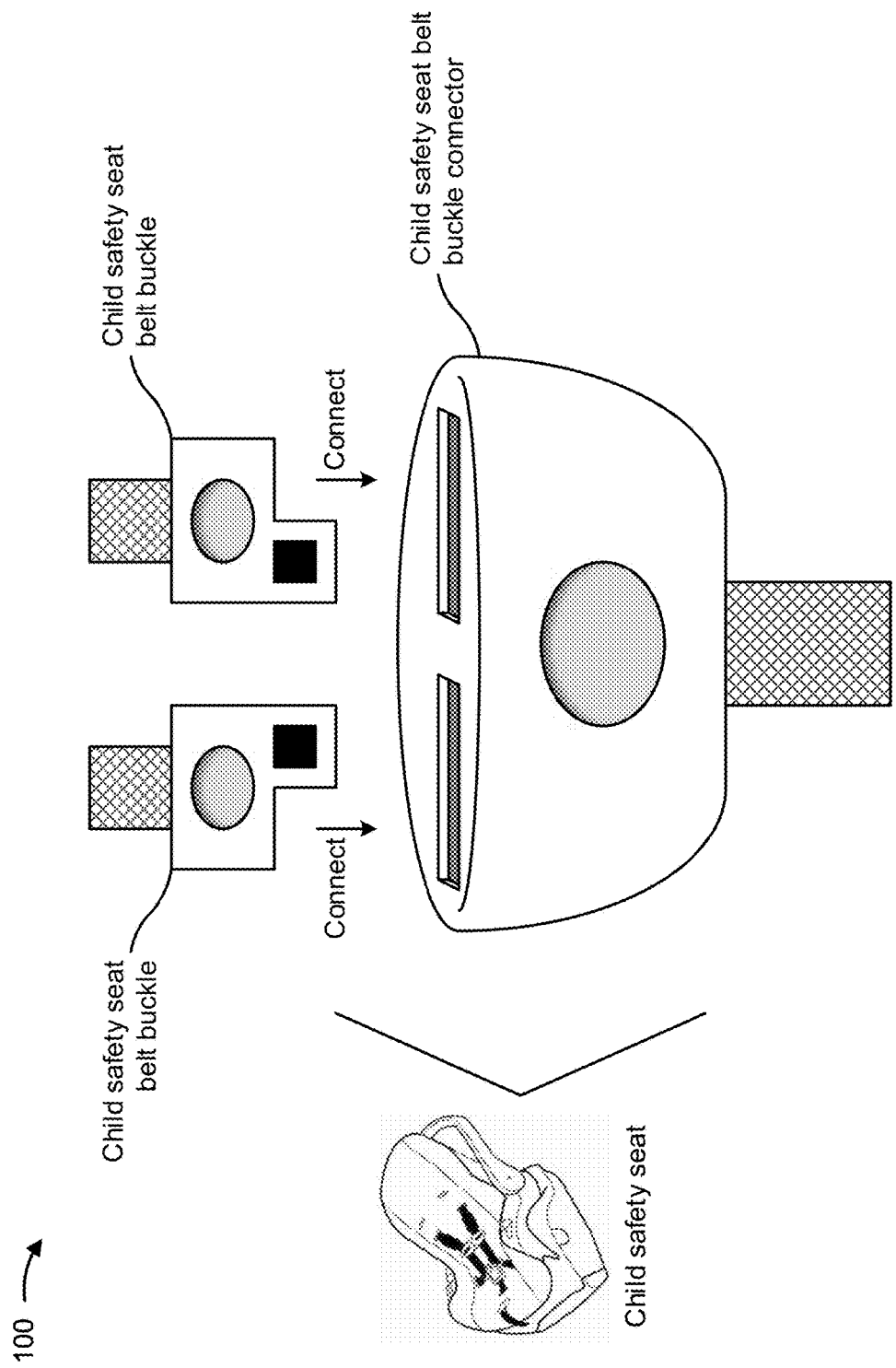

As shown in FIG. 1B, the child safety seat may include at least one child safety seat belt buckle (also referred to as a belt buckle or a buckle) and at least one child safety seat belt buckle connector (also referred to as a belt buckle connector or a buckle connector) that is configured to receive and connect with the belt buckle. The belt buckle may be connected with the belt buckle connector by inserting the belt buckle into the belt buckle connector. The belt buckle may include a mechanism (e.g., a button that can be depressed) for disconnecting the belt buckle from the belt buckle connector. Alternatively, or additionally, the belt buckle connector may include a mechanism (e.g., a button that can be depressed) for disconnecting the belt buckle from the belt buckle connector. The belt buckle may be disconnected from the belt buckle connector to allow a child to be placed into the child safety seat, and may be connected to the belt buckle connector to secure the child in the child safety seat.

Figure 1C:
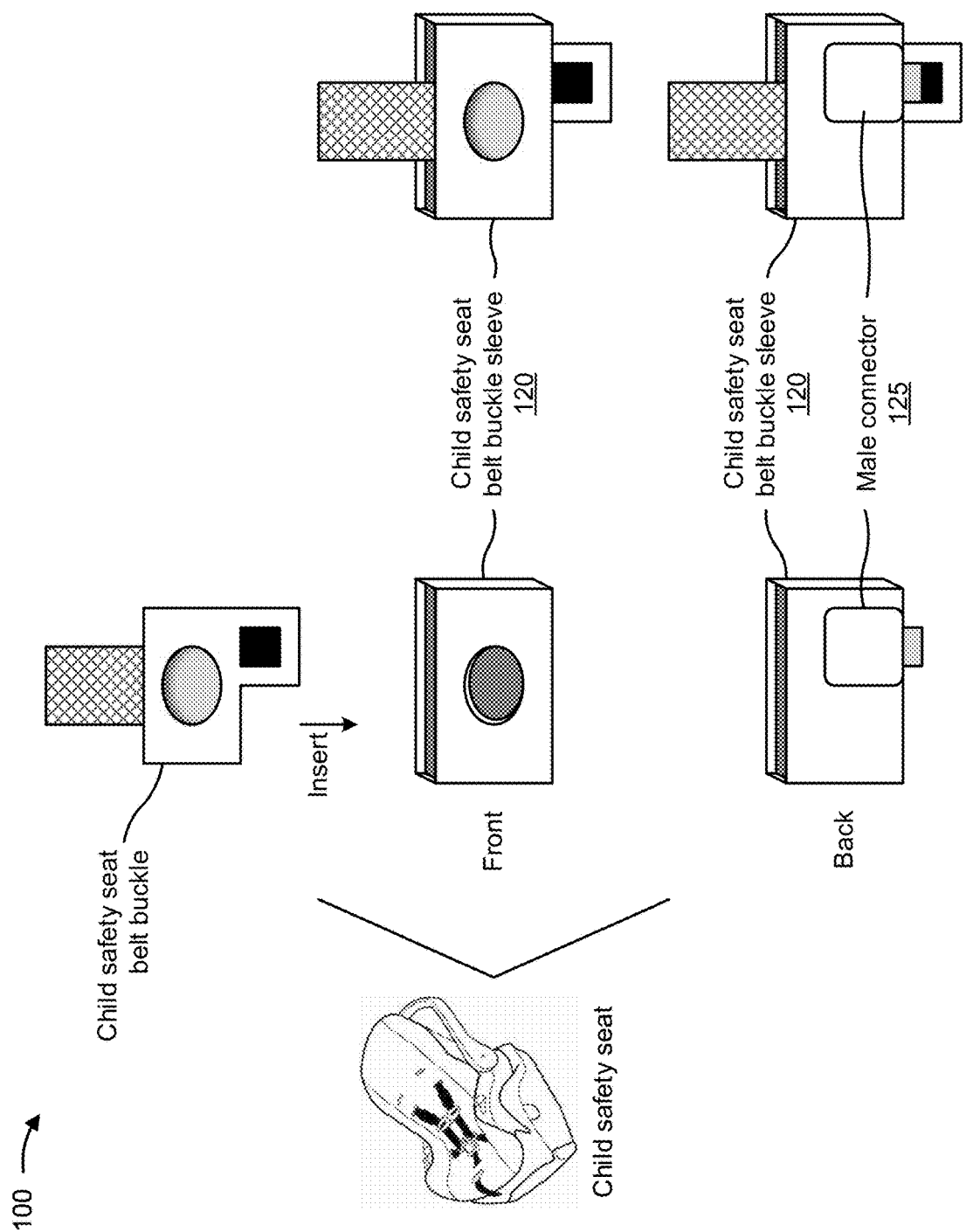

As shown in FIG. 1C, a child safety seat belt buckle sleeve 120 (also referred to as belt buckle sleeve 120) may be attached to the belt buckle by sliding belt buckle sleeve 120 over an outer surface of the belt buckle. In some implementations, if the child safety seat utilizes multiple belt buckles, as shown in FIG. 1B, belt buckle sleeve 120 may be attached to each of the multiple belt buckles. In some implementations, belt buckle sleeve 120 may receive and retain the belt buckle, as shown. For example, belt buckle sleeve 120 may include openings on opposite ends and may slide over the outer surface of the belt buckle. This may enable the belt buckle to extend through belt buckle sleeve 120, so that the belt buckle may connect to the belt buckle connector, as described above. In some implementations, belt buckle sleeve 120 may include a size and a shape that substantially matches a size and a shape of the belt buckle so that an inner surface of belt buckle sleeve 120 frictionally engages the outer surface of the belt buckle. Thus, belt buckle sleeve 120 may include multiple variations of shapes and sizes, corresponding to different shapes and sizes of belt buckles. In some implementations, belt buckle sleeve 120 may include an elastomeric material (e.g., a natural rubber, a synthetic rubber, a thermoplastic material, a saturated rubber, an unsaturated rubber, and/or the like).

Additionally, belt buckle sleeve 120 may include an opening (e.g., on a front side of belt buckle sleeve 120) to allow access to the mechanism (e.g., the button that can be depressed) for disconnecting the belt buckle (e.g., when the mechanism for disconnecting the belt buckle is on a front side of the belt buckle). Alternatively, when the mechanism for disconnecting the belt buckle is on a back side of the belt buckle, belt buckle sleeve 120 may include an opening (e.g., on a back side of belt buckle sleeve 120) to allow access to the mechanism for disconnecting the belt buckle.

As further shown in FIG. 1C, belt buckle sleeve 120 may include a male connector 125. As shown, male connector 125 may be provided on a back side of belt buckle sleeve 120. Alternatively, when the mechanism for disconnecting the belt buckle is on the back side of the belt buckle, male connector 125 may be provided on a front side of belt buckle sleeve 120. In some implementations, male connector 125 may include one or more pins that are sized and shaped to be received by one or more corresponding openings provided in a female connector, as described below. In some implementations, male connector 125 may include a male universal serial bus (USB) connector.

In some implementations, belt buckle sleeve 120 may include one or more sensors, such as a temperature sensor (e.g., a thermometer for measuring a temperature inside the vehicle), a heartrate sensor (e.g., for measuring a heartrate of a child in the child safety seat), a microphone (e.g., for capturing sounds from the child in the child safety seat), an accelerometer, a global positioning system (GPS) sensor, and/or the like.

Figure 1D:
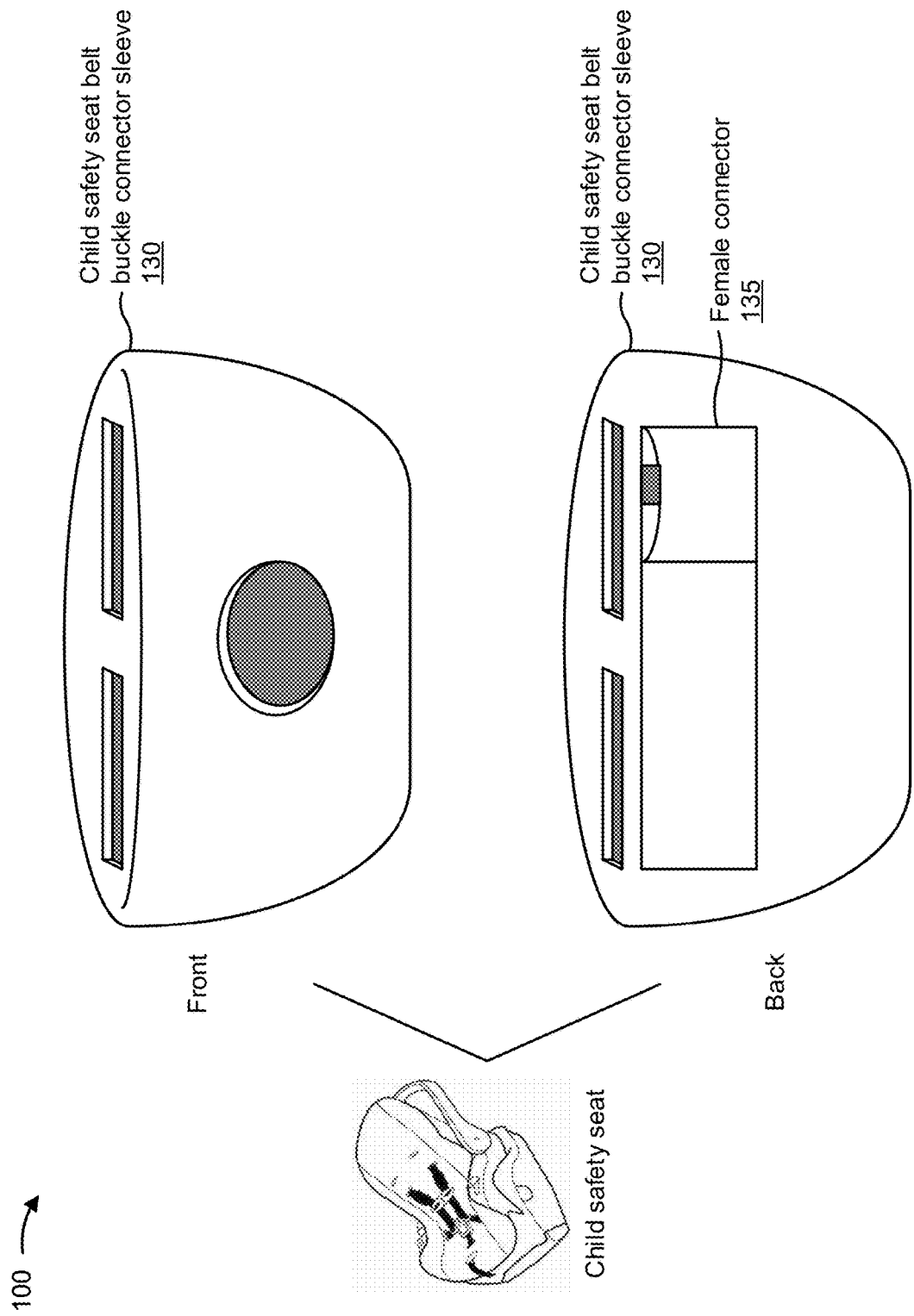

As shown in FIG. 1D, a child safety seat belt buckle connector sleeve 130 (also referred to as belt buckle connector sleeve 130) may be attached to the belt buckle connector by sliding belt buckle connector sleeve 130 over an outer surface of the belt buckle connector. In some implementations, belt buckle connector sleeve 130 may receive and retain the belt buckle connector, as shown. For example, belt buckle connector sleeve 130 may include openings on opposite ends, and may slide over the outer surface of the belt buckle connector. This may allow the belt buckle connector to receive and connect with the belt buckle, as described above. In some implementations, belt buckle connector sleeve 130 may include a size and a shape that substantially matches a size and a shape of the belt buckle connector so that an inner surface of belt buckle connector sleeve 130 frictionally engages the outer surface of the belt buckle connector. Thus, belt buckle connector sleeve 130 may include multiple variations of shapes and sizes, corresponding to different shapes and sizes of belt buckle connectors. In some implementations, belt buckle connector sleeve 130 may include an elastomeric material, such as the elastomeric material described above in connection with belt buckle sleeve 120.

Additionally, belt buckle connector sleeve 130 may include an opening (e.g., on a front side of belt buckle connector sleeve 130) to allow access to a mechanism (e.g., a button that can be depressed) for disconnecting the belt buckle (e.g., when the mechanism for disconnecting the belt buckle is on the front side of the belt buckle connector). Alternatively, when the mechanism for disconnecting the belt buckle is on the back side of the belt buckle connector, belt buckle connector sleeve 130 may include an opening (e.g., on a back side of belt buckle connector sleeve 130) to allow access to the mechanism for disconnecting the belt buckle.

In some implementations, belt buckle connector sleeve 130 may include a female connector 135. As shown, female connector 135 may be provided on a back side of belt buckle connector sleeve 130. Alternatively, when the mechanism for disconnecting the belt buckle is on the back of the belt buckle connector, female connector 135 may be provided on a front side of belt buckle connector sleeve 130. In some implementations, female connector 135 may include one or more openings that are sized and shaped to receive one or more corresponding pins of male connector 125. In some implementations, female connector 135 may include a female USB. In some implementations, if the child safety seat includes multiple belt buckles associated with multiple male connectors 125, belt buckle connector sleeve 130 may include female connector 135 for each of the multiple male connectors 125.

In some implementations, rather than belt buckle sleeve 120 including male connector 125 and belt buckle connector sleeve 130 including female connector 135, belt buckle sleeve 120 may include female connector 135 and belt buckle connector sleeve 130 may include male connector 125. In some implementations, belt buckle connector sleeve 130 may include one or more sensors, such as a temperature sensor, a heartrate sensor, a microphone, an accelerometer, a GPS sensor, and/or the like, as described above with respect to belt buckle sleeve 120.

Figure 1E:
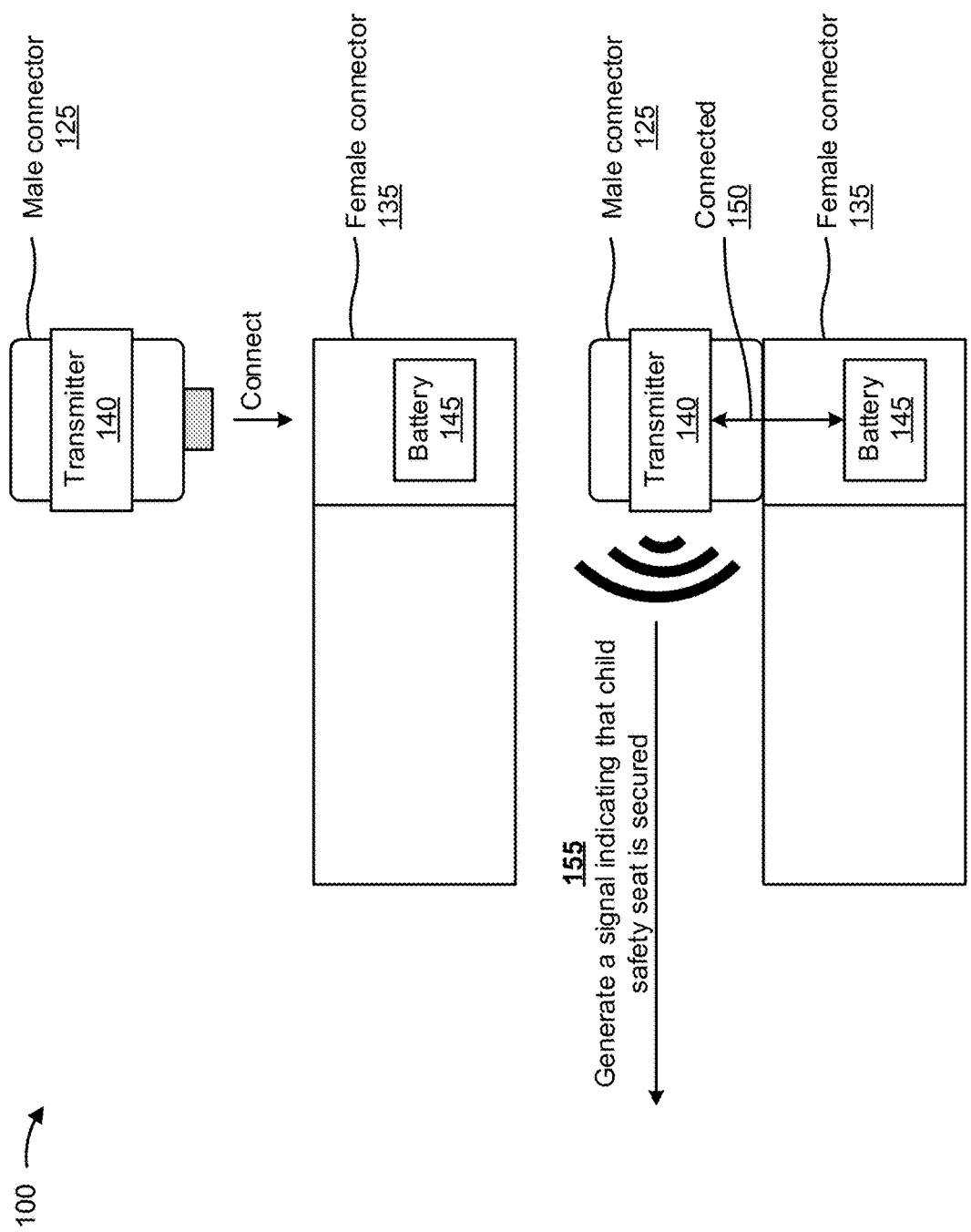

As shown in FIG. 1E, male connector 125 may include a transmitter 140 that is capable of generating a signal (e.g., a wireless signal). In some implementations, transmitter 140 may include a Bluetooth low energy beacon. Female connector 135 may include a battery 145 that is capable of providing energy to transmitter 140, when battery 145 is connected to transmitter 140. Alternatively, male connector 125 may include battery 145 and female connector 135 may include transmitter 140.

Male connector 125 and female connector 135 may be aligned so that male connector 125 may be inserted into female connector 135 when the belt buckle is connected to the belt buckle connector. For example, when male connector 125 is a male USB and female connector 135 is a female USB, the male USB may be inserted into (e.g., and connected to) the female USB. When male connector 125 is inserted into female connector 135, battery 145 may be connected to transmitter 140, as indicated by reference number 150 in FIG. 1E. Once connected, battery 145 may provide energy to transmitter 140. When transmitter 140 receives the energy from battery 145, transmitter 140 may generate a signal (e.g., a Bluetooth low energy signal). For example, as further shown in FIG. 1E, and by reference number 155, transmitter 140 may generate a signal indicating that the child safety seat is secured.

Figure 1F:
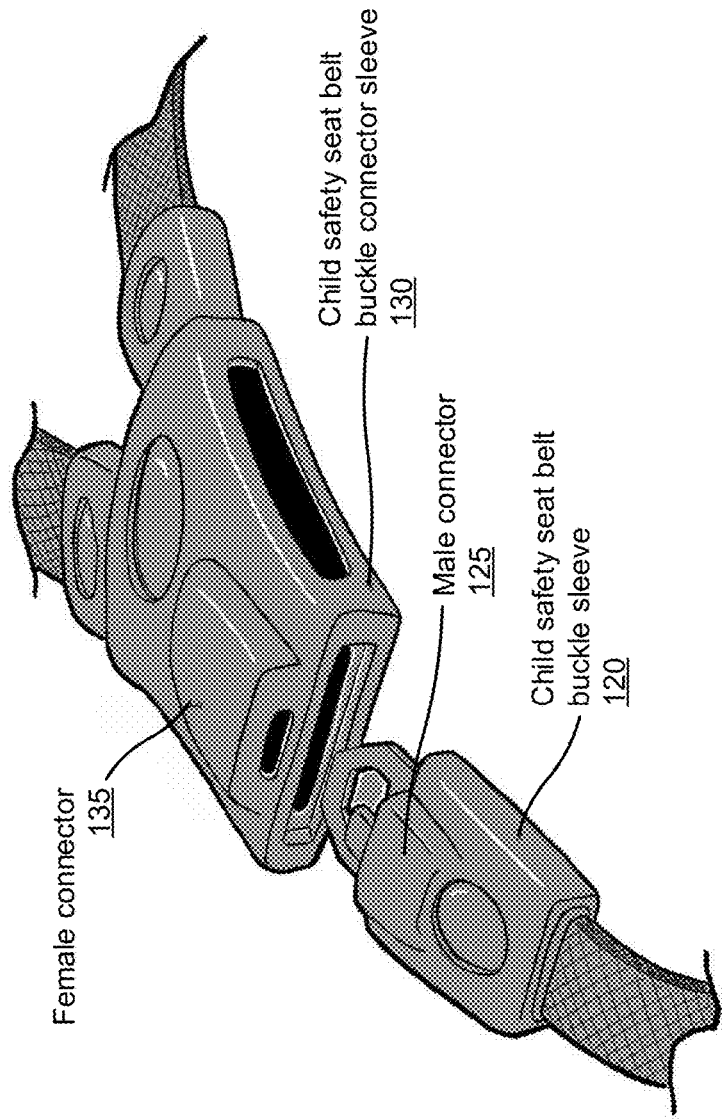

As shown in FIG. 1F, when the belt buckle with belt buckle sleeve 120 is connected to the belt buckle connector with belt buckle connector sleeve 130, male connector 125 may align with female connector 135 and may be connected to female connector 135, as described above. In the example shown in FIG. 1F, the belt buckle may be inserted into the belt buckle connector at a bottom end of the belt buckle connector, to secure the child safety seat, rather than into a top end of the belt buckle connector as described above. As further shown in FIG. 1F, belt buckle sleeve 120 may include male connector 125 on the front side of belt buckle sleeve 120, and belt buckle connector sleeve 130 may include female connector 135 on the front side of belt buckle connector sleeve 130. Additionally, belt buckle sleeve 120 may include the opening (e.g., for the mechanism for disconnecting the belt buckle) on the front side of belt buckle sleeve 120, and belt buckle connector sleeve 130 may include the opening (e.g., for the mechanism for disconnecting the belt buckle) on the front side of belt buckle connector sleeve 120.

Figure 1G:
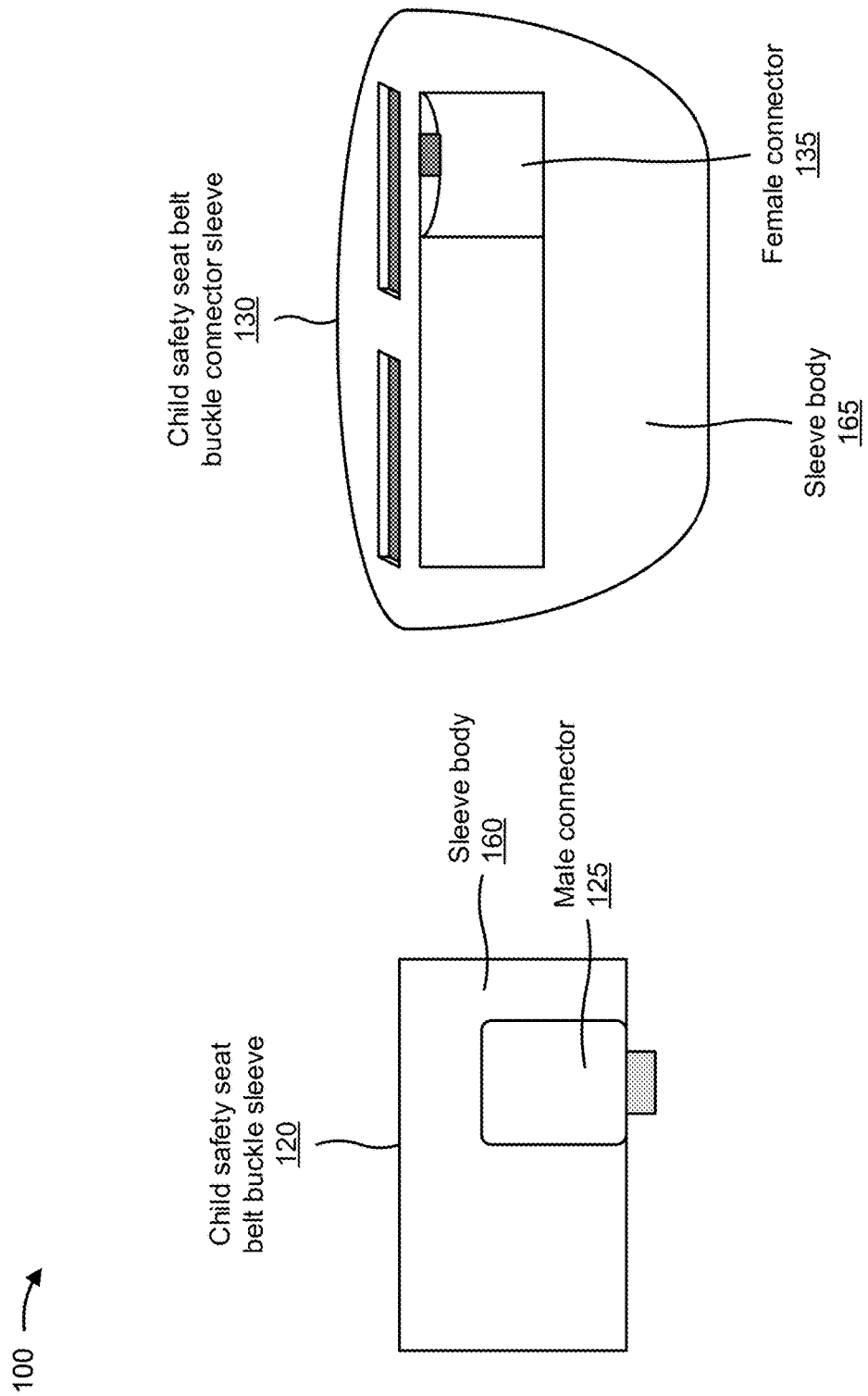

As shown in FIG. 1G, belt buckle sleeve 120 may include a sleeve body 160 and male connector 125 may connect to sleeve body 160. In some implementations, male connector 125 may attach to sleeve body 160 via an adhesive material (e.g., glue, tape, thermoplastic, and/or the like), a fastener (e.g., a screw, a bolt, and/or the like), and/or the like. Alternatively, male connector 125 may be integrally formed with sleeve body 160. In some implementations, sleeve body 160 may be omitted, and male connector 125 may attach directly to the belt buckle via an adhesive material. Alternatively, male connector 125 may be integrally formed with the belt buckle.

As further shown in FIG. 1G, belt buckle connector sleeve 130 may include a sleeve body 165 and female connector 135 may connect to sleeve body 165. In some implementations, female connector 135 may attach to sleeve body 165 via an adhesive material, a fastener, and/or the like. Alternatively, female connector 135 may be integrally formed with sleeve body 165. In some implementations, sleeve body 165 may be omitted, and female connector 135 may attach directly to the belt buckle connector via an adhesive material. Alternatively, female connector 135 may be integrally formed with the belt buckle connector.

Figure 1H:
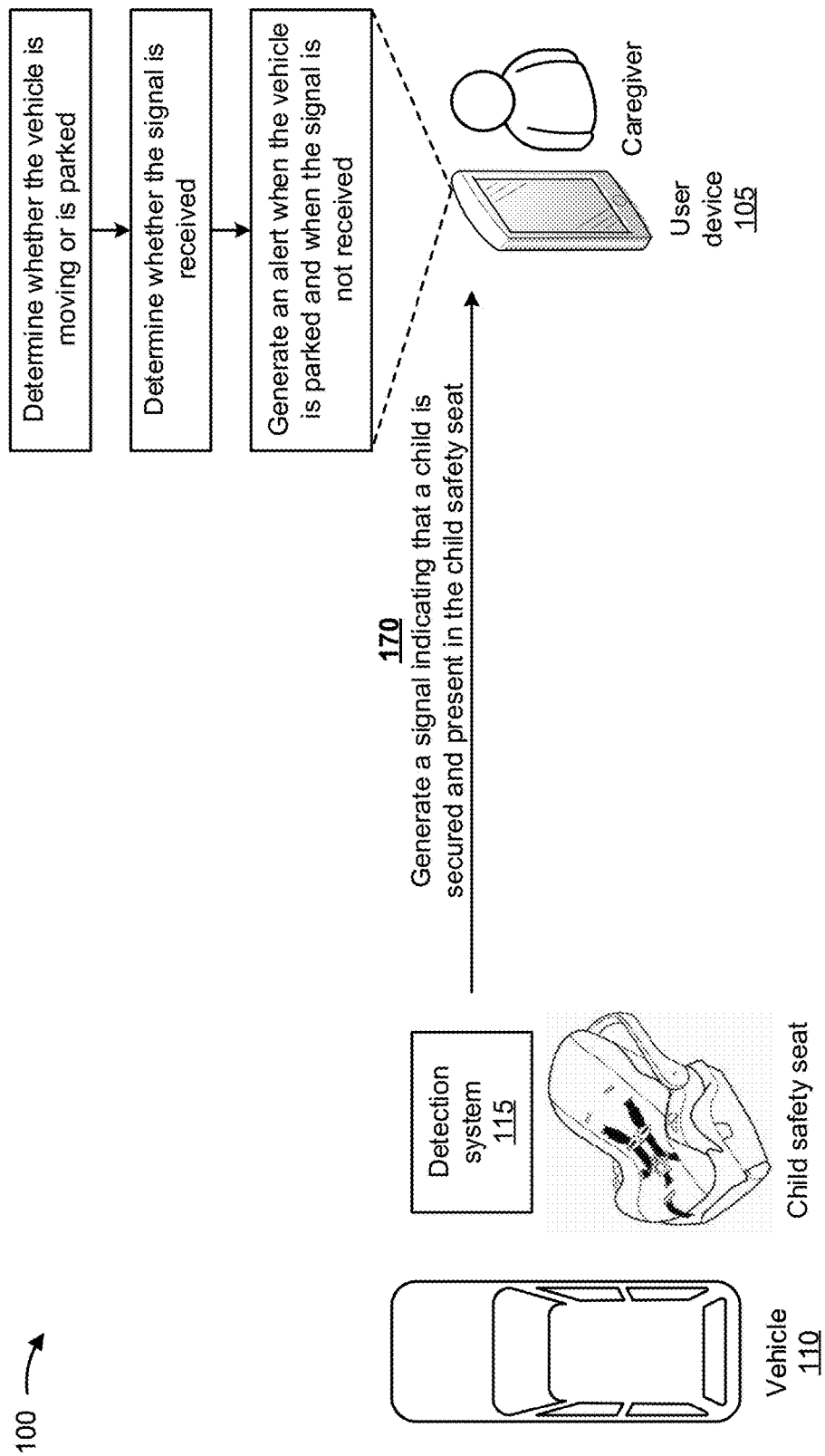
Figure 11:
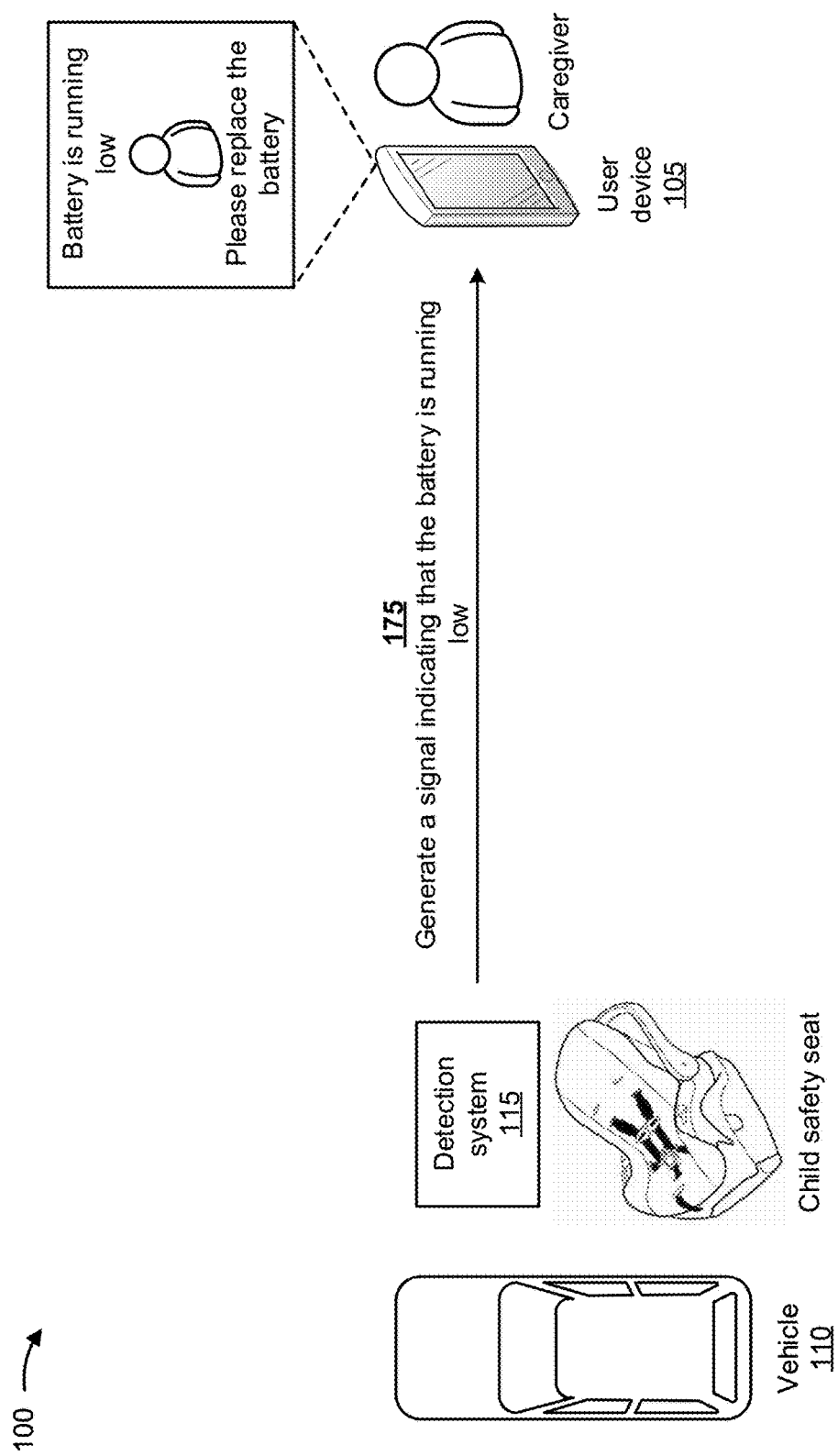

As shown in FIG. 1H, and by reference number 170, detection system 115 may generate a signal indicating that a child is secured and present in the child safety seat. For example, transmitter 140 may generate a signal, indicating that the child safety seat is secured, when the belt buckle is connected to the belt buckle connector (e.g., when male connector 125 is connected to female connector 135. Connecting male connector 125 to female connector 135, may cause battery 145 to provide energy to transmitter 140, which may cause transmitter 140 to generate the signal. User device 105 may be configured to receive the signal generated by transmitter 140. For example, user device 105 may include a Bluetooth low energy beacon receiver and may include software installed that manages the Bluetooth low energy beacon receiver, interprets Bluetooth low energy beacon signals, and/or the like.

Upon receiving the signal, and as shown in FIG. 1H, user device 105 may determine whether vehicle 110 is moving or is parked. For example, user device 105 may continually (e.g., every one second, every five seconds, and/or the like) communicate with a system of vehicle 110 (e.g., a tracking system, a navigation system, and/or the like) or with a sensor of detection system 115 to determine whether vehicle 110 is moving or stationary, is on a road or off of a road, and/or the like. User device 105 may determine whether the signal is still being received, and may generate an alert when vehicle 110 is parked and the signal is not received. User device 105 may display the alert to the caregiver in order to warn the caregiver that the child is still in vehicle 110.

In some implementations, the signal may be received by user device 105 for a particular distance that is based on a strength the signal (e.g., a range of transmitter 140). For example, the particular distance may be five meters, ten meters, twenty meters, and/or the like. Thus, user device 105 may generate the alert when user device 105 travels beyond the range of transmitter 140. Additionally, or alternatively, user device 105 may determine a distance between transmitter 140 and user device 105 (e.g., based on the strength of the signal, based on global positioning system (GPS) coordinates of user device 105 relative to GPS coordinates of vehicle 110 or detection system 115, and/or the like). In this case, user device 105 may generate the alert when user device 105 travels beyond a threshold distance.

In some implementations, if the caretaker does not confirm receipt of the alert within a threshold period of time (e.g., thirty seconds, forty seconds, one minute, and/or the like), further action may be taken. For example, detection system 115 may automatically contact other systems or people (e.g., an emergency response system, emergency response personnel, a primary contact of the caregiver, a secondary content of the caregiver, and/or the like), and may provide the system or the people with a location of the child (e.g., the location of vehicle 110, the location of the child safety seat, and/or the like). In some implementations, detection system 115 may provide additional information to user device 105, the system, or the people, such as a temperature inside vehicle 110 (e.g., generated by a temperature sensor), a heartrate of the child (e.g., generated by a heartrate sensor), audio data (e.g., generated by a microphone), and/or the like. In some implementations, the alerts provided by user device 105 may increase (e.g., become more frequent, increase in volume, increase in vibration, and/or the like) over time or as user device 105 moves away from detection system 115, may overrise any muting or volume setting of user device 105, and/or the like.

As shown in FIG. 1I, and by reference number 175, detection system 115 may generate a signal indicating that battery 145 is running low when battery 145 has become depleted below an energy level threshold. For example, detection system 115 may monitor a remaining energy level of battery 145 and may generate the signal, indicating that the battery is running low, when the energy level fails to satisfy the energy level threshold. Upon receiving the signal indicating that the battery is running low, user device 105 may display a user interface recommending that the caregiver replace the battery. Additionally, or alternatively, user device 105 may play a sound, may vibrate, and/or the like upon receiving the signal. In some implementations, user device 105 may continue to provide a message, a sound, a vibration, and/or the like periodically (e.g., every day, every week, and/or the like) until battery 145 is replaced. In some implementations, user device 105 may increase the frequency of messages, sounds, vibrations, and/or the like, when battery energy is further reduced (e.g., fails to satisfy a second energy level threshold that is lower than a first energy level threshold).

In this way, several different stages of the process for detecting and preventing leaving of an unattended child in a child safety seat of a vehicle are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a detection system that may be utilized with various child safety seats, and that detects and prevents unattended children in the various child safety seats. Finally, the process for detecting and preventing an unattended child in a child safety seat of a vehicle conserves computing resources, networking resources, and/or the like that would otherwise be wasted in responding to injured children left in child safety seats of vehicles, investigating caregivers responsible for the injured children, caring for the injured children, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
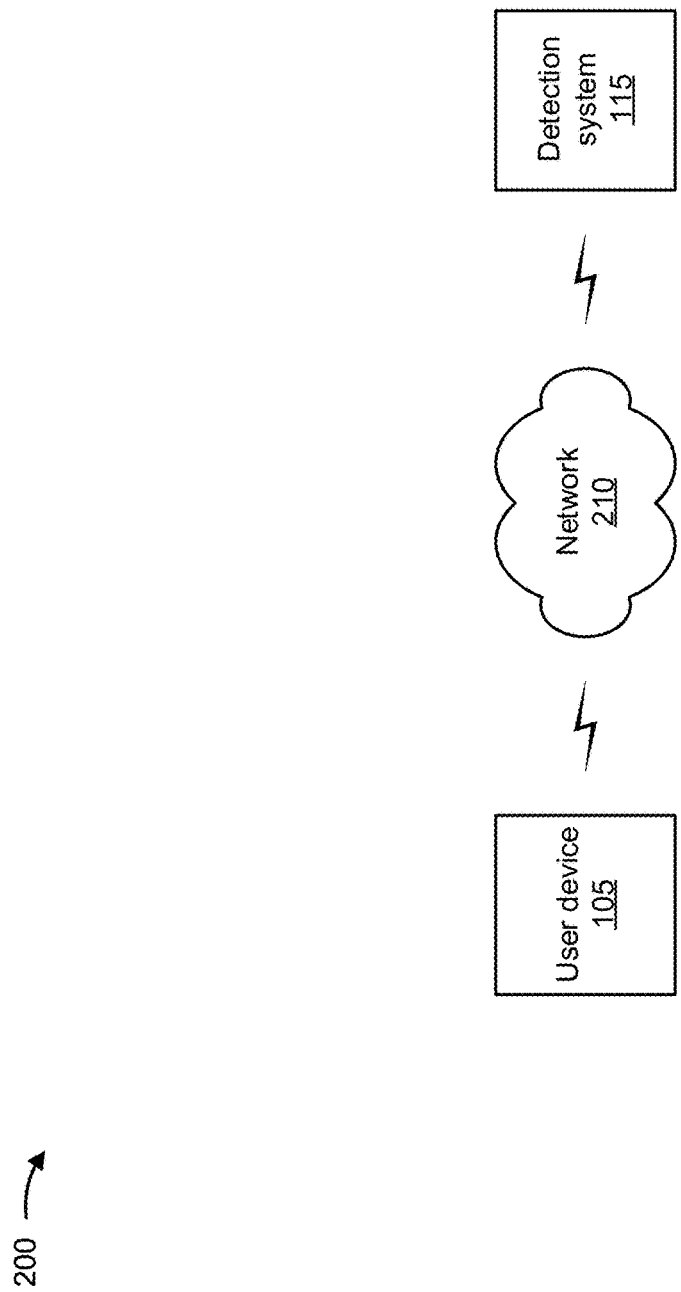
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, detection system 115, and a network 210. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, user device 105 may receive information from and/or transmit information to detection system 115.

Detection system 115 includes one or more devices that detects and prevents an unattended child in a child safety seat of a vehicle. In some implementations, detection system 115 may be designed to fit with various types of child safety seat configurations provided in various types of vehicles, as described above. In some implementations, detection system 115 may receive information from and/or transmit information to one or more user devices 105.

Network 210 includes one or more wired and/or wireless networks. For example, network 210 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
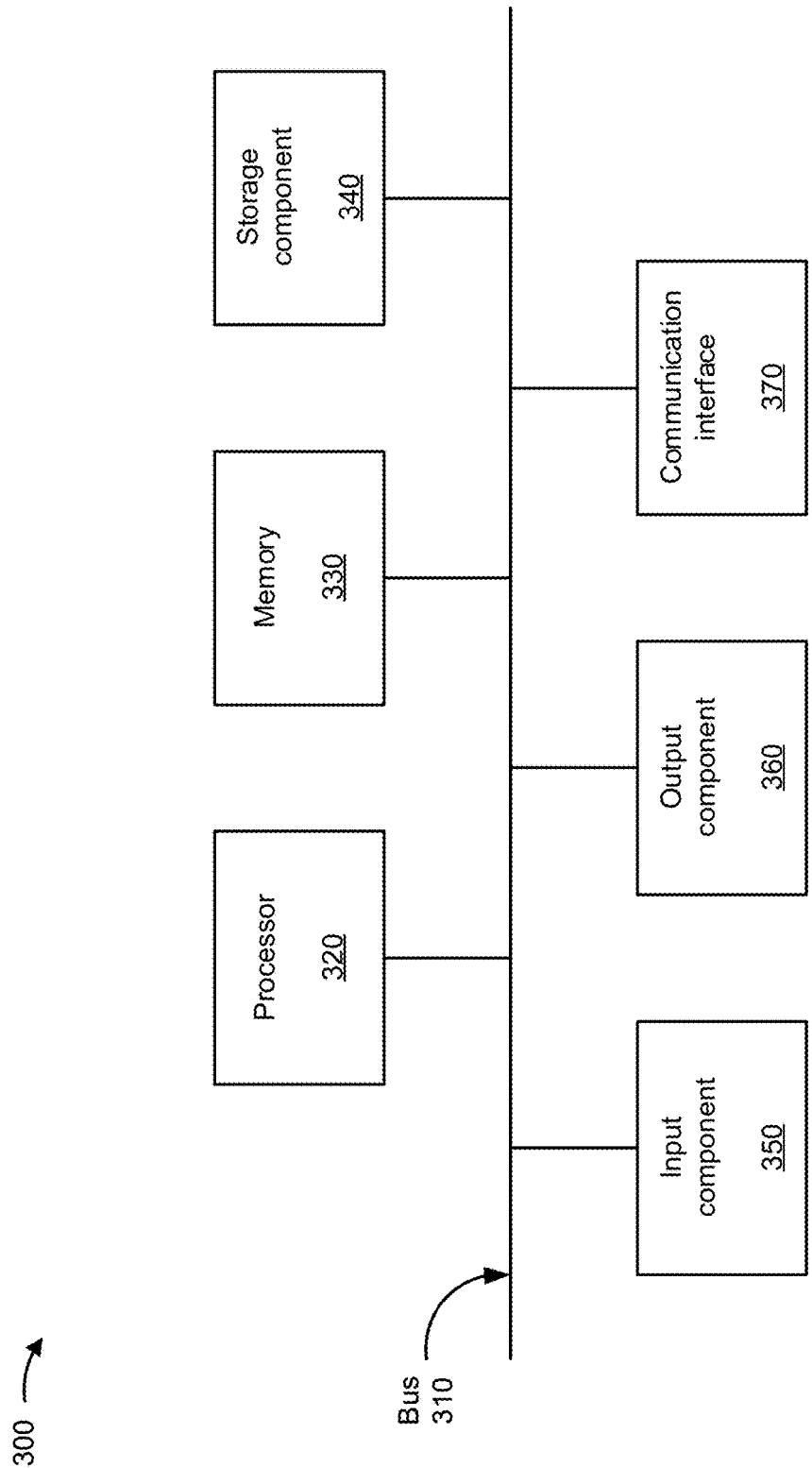
FIG. 3 is a diagram of example components of one or more devices of FIG. 2.

FIG. 3 is a diagram of example components of a device 300. Device 300 may correspond to user device 105 and/or detection system 115. In some implementations, user device 105 and/or detection system 115 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
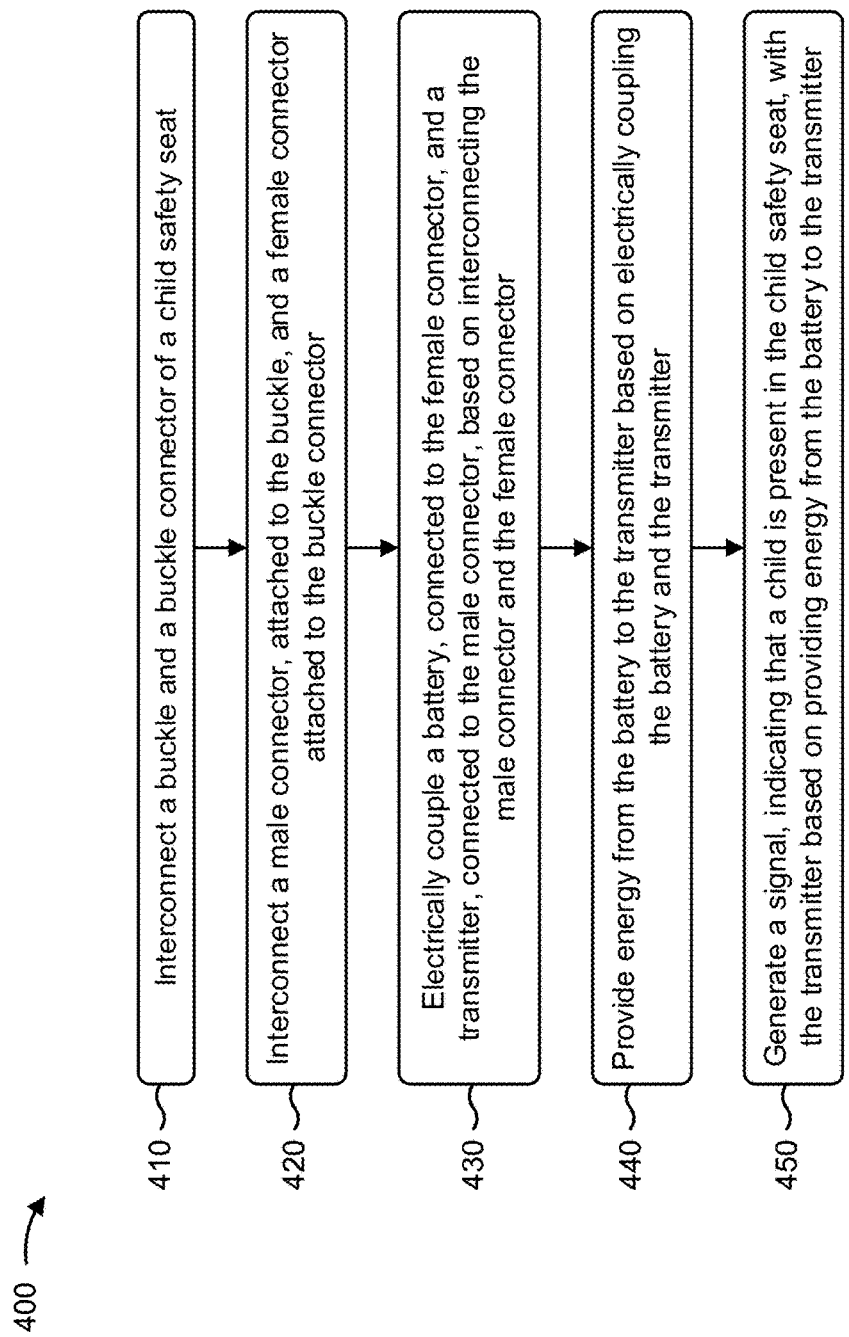
FIG. 4 is a flow chart of an example process for detecting and preventing an unattended child in a child safety seat of a vehicle.

FIG. 4 is a flow chart of an example process 400 for detecting and preventing an unattended child in a child safety seat of a vehicle. In some implementations, one or more process blocks of FIG. 4 may be performed by a system (e.g., detection system 115). In some implementations, one or more process blocks of FIG. 4 may be performed by another device or a group of devices separate from or including the system, such as a user device (e.g., user device 105).

As shown in FIG. 4, process 400 may include interconnecting a buckle and a buckle connector of a child safety seat (block 410). For example, a user of the system may interconnect a buckle and a buckle connector of a child safety seat, as described above.

As further shown in FIG. 4, process 400 may include interconnecting a male connector, attached to the buckle, and a female connector attached to the buckle connector (block 420). For example, a user of the system may interconnect a male connector, attached to the buckle, and a female connector attached to the buckle connector, as described above.

As further shown in FIG. 4, process 400 may include electrically coupling a battery, connected to the female connector, and a transmitter, connected to the male connector, based on interconnecting the male connector and the female connector (block 430). For example, the system (e.g., using processor 320, memory 330, communication interface 370, and/or the like) may electrically couple a battery, connected to the female connector, and a transmitter, connected to the male connector, based on interconnecting the male connector and the female connector, as described above.

As further shown in FIG. 4, process 400 may include providing energy from the battery to the transmitter based on electrically coupling the battery and the transmitter (block 440). For example, the system (e.g., using processor 320, output component 360, communication interface 370, and/or the like) may provide energy from the battery to the transmitter based on electrically coupling the battery and the transmitter, as described above.

As further shown in FIG. 4, process 400 may include generating a signal, indicating that a child is present in the child safety seat, with the transmitter based on providing energy from the battery to the transmitter (block 450). For example, the system (e.g., using processor 320, memory 330, storage component 340, communication interface 370, and/or the like) may generate a signal, indicating that a child is present in the child safety seat, with the transmitter based on providing energy from the battery to the transmitter, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A detection system, comprising:
    a first sleeve shaped to receive and retain a buckle of a child safety seat,
        wherein the first sleeve includes:
            a first body portion shaped to receive and retain the buckle of the child safety seat,
            a male connector portion integrally formed with the first body portion, and
            a transmitter electrically coupled to the male connector portion; and
    a second sleeve shaped to receive and retain a buckle connector of the child safety seat,
        wherein the buckle connector of the child safety seat is configured to receive and connect with the buckle of the child safety seat,
        wherein the second sleeve includes:
            a second body portion shaped to receive and retain the buckle connector of the child safety seat,
            a female connector portion connected to the second body portion, and
            a battery electrically coupled to the female connector portion and configured to provide energy to the transmitter when the male connector portion communicates with the female connector portion,
        wherein the male connector portion communicates with the female connector portion when the buckle connector connects with the buckle, and
        wherein the transmitter is configured to generate a signal that indicates that a child is present in the child safety seat, in response to the transmitter receiving energy from the battery.

2. The detection system of claim 1, wherein the male connector portion includes a male Universal Serial Bus (USB) connector.

3. The detection system of claim 1, wherein the female connector portion includes a female Universal Serial Bus (USB) connector.

4. The detection system of claim 1, wherein the male connector portion includes one or more pins that are sized and shaped to be received by one or more corresponding openings provided in the female connector portion.

5. The detection system of claim 1, wherein the first sleeve and the second sleeve comprise an elastomeric material.

6. The detection system of claim 1, wherein a size and a shape of the first sleeve substantially matches a size and shape of the buckle of the child safety seat so that an inner surface of the first sleeve frictionally engages an outer surface of the buckle of the child safety seat.

7. The detection system of claim 1, wherein a size and a shape of the second sleeve substantially matches a size and shape of the buckle connector of the child safety seat so that an inner surface of the second sleeve frictionally engages an outer surface of the buckle connector of the child safety seat.

8. The detection system of claim 1, wherein the transmitter includes a Bluetooth low energy beacon.

9. The detection system of claim 1, wherein the first sleeve further comprises one or more of:
    a temperature sensor,
    a heartrate sensor, or
    a microphone.

10. The detection system of claim 1, wherein the female connector portion is connected to the second body portion via an adhesive material or is integrally formed with the second body portion.

11. The detection system of claim 1, wherein the transmitter is configured to generate a low battery signal when the battery becomes depleted.

12. The detection system of claim 1, wherein the transmitter provides the signal to a user device when the user device is within a predetermined distance from the transmitter.

13. A child safety seat, comprising:
    a buckle;
    a buckle connector,
        wherein the buckle connector is configured to receive and connect with the buckle;
    a male connector attached to the buckle;
    a transmitter electrically coupled to the male connector;
    a female connector attached to the buckle connector; and
    a battery electrically coupled to the female connector and configured to provide energy to the transmitter when the male connector communicates with the female connector,
        wherein the male connector communicates with the female connector when the buckle connector connects with the buckle, and wherein the transmitter is configured to generate a signal, indicating that a child is present in the child safety seat, when the transmitter receives energy from the battery.

14. The child safety seat of claim 13, wherein the male connector includes a male Universal Serial Bus (USB) connector, and wherein the female connector includes a female USB connector.

15. The child safety seat of claim 13, wherein the male connector includes one or more pins that are sized and shaped to be received by one or more corresponding openings provided in the female connector.

16. The child safety seat of claim 13, wherein the transmitter includes a Bluetooth low energy beacon.

17. The child safety seat of claim 13, wherein the transmitter provides the signal to a user device when the user device is within a predetermined distance from the transmitter.

18. The child safety seat of claim 13, wherein the male connector is attached to the buckle via an adhesive material or is integrally formed with the buckle.

19. The child safety seat of claim 13, wherein the female connector is attached to the buckle connector via an adhesive material or is integrally formed with the buckle connector.

20. A detection system, comprising:
a female connector attached to a buckle connector of a child safety seat,
a transmitter electrically coupled to the female connector;
a male connector attached to a buckle of the child safety seat,
wherein the buckle connector of the child safety seat is configured to receive and connect with the buckle of the child safety seat;
a battery electrically coupled to the male connector and configured to provide energy to the transmitter when the female connector communicates with the male connector,
wherein the female connector communicates with the male connector when the buckle connector connects with the buckle, and
wherein the transmitter is configured to generate a signal, indicating that a child is present in the child safety seat, when the transmitter receives energy from the battery.

* * * * *